(12) United States Patent
Black et al.

(10) Patent No.: US 10,715,248 B2
(45) Date of Patent: *Jul. 14, 2020

(54) SYSTEM AND METHOD FOR COMMUNICATING OVER AN 802.15.4 NETWORK

(71) Applicant: SIMPLE WORKS, INC., Libertyville, IL (US)

(72) Inventors: Tom Black, Libertyville, IL (US); Dale Mason, Lexington, KY (US); Robert Schneider, Hypoluxo, FL (US); Paul Bricketto, Boynton Beach, FL (US)

(73) Assignee: SIMPLE WORKS, INC., Hudson, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/773,592

(22) Filed: Jan. 27, 2020

(65) Prior Publication Data

US 2020/0162152 A1    May 21, 2020

Related U.S. Application Data

(63) Continuation of application No. 16/538,279, filed on Aug. 12, 2019, now Pat. No. 10,547,376, which is a
(Continued)

(51) Int. Cl.
*H04M 1/66*   (2006.01)
*H04M 1/68*   (2006.01)
(Continued)

(52) U.S. Cl.
CPC ............. *H04B 7/26* (2013.01); *H04L 12/282* (2013.01); *H04N 5/76* (2013.01); *H04W 4/80* (2018.02);
(Continued)

(58) Field of Classification Search
CPC ....... H04W 84/18; H04W 4/80; H04W 80/00; H04W 28/14; H04W 84/12
(Continued)

(56) References Cited

U.S. PATENT DOCUMENTS 5,113,413 A * 5/1992 Brown ................. H04W 84/08
                                            375/267
5,455,965 A * 10/1995 Shaughnessy ......... H04H 20/67
                                            455/503
(Continued)

*Primary Examiner* — Joseph Arevalo
(74) *Attorney, Agent, or Firm* — Baker Botts L.L.P.

(57) ABSTRACT

A method of reducing data transfer while increasing image information over an 802.15.4 network includes obtaining an image with a sensor, modulating a representation of the image using a first 802.15.4 modem, sending the representation of the image to a coordinator, demodulating the representation of the image using a second 802.15.4 modem, and digitally enhancing at least one of the representation of the image and the image. A system for communication over an 802.15.4 network includes a sensor for obtaining data, the size of the data being at least an order of magnitude greater than the size of an 802.15.4 packet, a first 802.15.4 modem coupled to the sensor, a buffer for temporarily storing the data to allow transmission of portions of the data; the buffer being coupled to the sensor, a coordinator coupled to the sensor, the coordinator being capable of communicating with a computer, and a second 802.15.4 modem coupled to the coordinator.

9 Claims, 8 Drawing Sheets

Related U.S. Application Data continuation of application No. 16/272,606, filed on Feb. 11, 2019, now Pat. No. 10,382,122, which is a continuation of application No. 16/115,269, filed on Aug. 28, 2018, now Pat. No. 10,205,515, which is a continuation of application No. 15/926,766, filed on Mar. 20, 2018, now Pat. No. 10,069,561, which is a continuation of application No. 15/709,853, filed on Sep. 20, 2017, now Pat. No. 9,948,382, which is a continuation of application No. 15/256,115, filed on Sep. 2, 2016, now Pat. No. 9,806,796, which is a continuation of application No. 14/521,629, filed on Oct. 23, 2014, now Pat. No. 9,461,735, which is a continuation of application No. 13/621,572, filed on Sep. 17, 2012, now Pat. No. 8,976,767, which is a continuation of application No. 12/611,443, filed on Nov. 3, 2009, now Pat. No. 8,358,639, which is a continuation of application No. 11/235,429, filed on Sep. 26, 2005, now Pat. No. 7,636,340.

(60) Provisional application No. 60/612,901, filed on Sep. 24, 2004.

(51) Int. Cl.

| | | |
|---|---|---|
| *H04M 3/16* | (2006.01) | |
| *H04B 7/26* | (2006.01) | |
| *H04W 4/80* | (2018.01) | |
| *H04W 80/00* | (2009.01) | |
| *H04N 5/76* | (2006.01) | |
| *H04L 12/28* | (2006.01) | |
| *H04W 84/18* | (2009.01) | |
| *H04N 5/38* | (2006.01) | |

(52) U.S. Cl.
CPC ..... *H04W 80/00* (2013.01); *H04L 2012/2841* (2013.01); *H04N 5/38* (2013.01); *H04W 84/18* (2013.01)

(58) Field of Classification Search
USPC ......... 455/411, 41.2, 556.1, 550.1, 420, 419, 455/418
See application file for complete search history.

(56) References Cited

U.S. PATENT DOCUMENTS

| | | | | |
|---|---|---|---|---|
| 6,529,486 | B1* | 3/2003 | Barnes | H04W 84/08 370/327 |
| 6,684,080 | B1* | 1/2004 | Barnes | H04W 36/06 455/515 |
| 6,771,703 | B1* | 8/2004 | Oguz | G11B 27/034 375/240.03 |
| 8,102,784 | B1* | 1/2012 | Lemkin | G01S 5/0289 370/255 |
| 2001/0010689 | A1* | 8/2001 | Awater | H04W 16/14 370/344 |
| 2002/0067408 | A1* | 6/2002 | Adair | A61B 1/00016 348/76 |
| 2004/0070515 | A1* | 4/2004 | Burkley | G01S 5/0027 340/8.1 |
| 2008/0076425 | A1* | 3/2008 | Khetawat | H04W 88/12 455/436 |
| 2008/0114239 | A1* | 5/2008 | Randall | G01S 7/52073 600/437 |
| 2010/0162036 | A1* | 6/2010 | Linden | G06F 11/181 714/4.11 |
| 2010/0169446 | A1* | 7/2010 | Linden | G06F 11/181 709/206 |
| 2011/0034170 | A1* | 2/2011 | Zhong | H04W 48/18 455/435.3 |
| 2013/0337822 | A1* | 12/2013 | Rubin | H04L 1/00 455/452.1 |

* cited by examiner

SYSTEM AND METHOD FOR COMMUNICATING OVER AN 802.15.4 NETWORK

PRIORITY AND RELATED APPLICATION

This application is a continuation of U.S. patent application Ser. No. 16/538,279, filed Aug. 12, 2019, which is a continuation of U.S. patent application Ser. No. 16/272,606, filed Feb. 11, 2019, now U.S. Pat. No. 10,382,122 issued Aug. 13, 2019, which is a continuation of U.S. patent application Ser. No. 16/115,269, filed Aug. 28, 2018, now U.S. Pat. No. 10,205,515 issued Feb. 12, 2019, which is a continuation of U.S. patent application Ser. No. 15/926,766, filed Mar. 20, 2018, now U.S. Pat. No. 10,069,561 issued Sep. 4, 2018, which is a continuation of U.S. patent application Ser. No. 15/709,853, filed Sep. 20, 2017, now U.S. Pat. No. 9,948,382 issued Apr. 17, 2018, which is a continuation of U.S. patent application Ser. No. 15/256,115, filed Sep. 2, 2016, now U.S. Pat. No. 9,806,796 issued Oct. 31, 2017, which is a continuation of U.S. patent application Ser. No. 14/521,629, filed Oct. 23, 2014, now U.S. Pat. No. 9,461,735 issued Oct. 4, 2016, which is a continuation of U.S. patent application Ser. No. 13/621,572, filed Sep. 17, 2012, now U.S. Pat. No. 8,976,767 issued Mar. 10, 2015, which is a continuation of U.S. patent application Ser. No. 12/611,443, filed Nov. 3, 2009, now U.S. Pat. No. 8,358,639 issued Jan. 22, 2013, which is a continuation of U.S. patent application Ser. No. 11/235,429, filed Sep. 26, 2005, now U.S. Pat. No. 7,636,340 issued Dec. 22, 2009, which claims priority to U.S. Provisional Patent Application Ser. No. 60/612,901, which was filed Sep. 24, 2004, each of which is hereby incorporated by reference in its entirety.

FIELD OF THE INVENTION

This application relates generally to data communication and particularly to data communication using the wireless IEEE 802.15.4 protocol over a WPAN (wireless personal area network) optimized for low power, low data rate networks.

BACKGROUND INFORMATION

The use of imaging technology is exploding with the advent of low-cost mega pixel digital cameras and cameras inside cell phones. Cities are routinely rolling out cameras in high-risk areas to help deter crime or provide background on events. Webcams, or cameras attached to a personal computer, continue to grow in popularity and free services are expanding to support their use, such as Yahoo! Messenger. Wireless home monitoring and control products are hitting the market with wireless 802.11 cameras which require tethering to a power source but can send their images and video to a personal computer located somewhere nearby. Society is becoming more aware of digital imaging technologies and their advantages.

CMOS (Complementary Metal Oxide Semiconductor) is the technology popularly used to make computer processors such as the Pentium. As a substitute for CCD (charge coupled device) chips, CMOS imagers allow a camera with lower power consumption, lower signal-to-noise ratio, and smaller overall design. CMOS imagers have been on the market since the late 1990's, but have seen a spike in popularity as they have been adopted into cell phones since about 2002. With the huge volumes of cellular phones, the price and performance of CMOS images have been rapidly improving, and they are challenging CCD's for image quality.

A brief history of the IEEE 802.15.4 protocol development begins as follows: whereas IEEE 802.11 (WiFi) was concerned with features such as ethernet matching speed, long range (100 m), complexity to handle seamless roaming, message forwarding, and data throughput of 2-11 Mbps; WPANs (Wireless Peronal Area Networks) are focused on a space around a person or object that typically extends up to 10 m in all directions. The focus of WPANs is low-cost, low power, short range, and very small size. The IEEE 802.15 working group currently defined three classes of WPANs that are differentiated by data rate, battery drain, and quality of service (QoS). The present invention concerns the last class. The first class, a high data rate WPAN (IEEE 802.15.3) is suitable for multi-media applications that require very high QoS. Medium rate WPANs (IEEE 802.15.1/Bluetooth) will handle a variety of tasks ranging from cell phones to PDA communications and have QoS suitable for voice communications. The last class, a low rate WPANs (IEEE 802.15.4/LR-WPAN) is intended to serve a set of industrial, residential, and medical applications. These applications have very low power consumption, a cost requirement not considered by the above WPANs, and relaxed needs for data rate and QoS. The low data rate enables the LR-WPAN to consume very little power.

The IEEE 802.15.4 wireless protocol is still in its infancy and is being rolled out primarily in applications such as sensors, interactive toys, smart badges, remote controls, remote metering, and home and industrial automation. The 802.15.4 protocol supports data rates of 250 kbps at 2.405-2.480 Ghz with 16 channels (world-wide), 40 kbps at 902-928 Mhz with 10 channels (Americas), and 20 kbps at 868.3 Mhz with 1 channel (Europe). The protocol supports automatic network establishment by the coordinator; a fully hand-shaked protocol for transfer reliability; and power management to ensure low power consumption. The wireless IEEE 802.15.4-2003 standard was approved in May of 2003 and was published in October of the same year. The standard is still under further development with 2 additional task groups, 802.15.4a and 802.15.4b continuing the development. Current areas of development (as of September 2005) include resolving ambiguities, reducing unnecessary complexity, increasing flexibility in security key usage, and considerations for newly available frequency allocations among others.

General requirements of sensor/control networks include that they can be quite large, employing 255 clusters of 254 nodes each (64,770 nodes); are suitable for latency-tolerant applications; can operate very reliably for years without any operator intervention; have very long battery life (up to several years from an AA cell); very low infrastructure cost (low device and setup costs); very low complexity and small size; and device data rates and QoS (Quality of Service, i.e., delay, jitter, throughput, and reliability) needs are low.

The IEEE 802.15.4 standard was developed to address the low power, low-bandwidth market; primarily focused on controls signals. In general terms, 802.15.4 is seen as one of the lowest-bandwidth wireless technologies available on the market today, and provides the corresponding benefit of long battery life. Presentations typically show the following:

TABLE 1

| Technology | Range | Data Rate |
| --- | --- | --- |
| 802.15.4 | WPAN to WLAN | <0.25 Mbps |
| 802.15.1 (Bluetooth) | WPAN | >0.1 Mbps; <1 Mbps |
| 802.11 (WiFi) | WLAN | >1 Mbps; <100 Mbps |

Zigbee is a protocol layer that sits "on top" of 802.15.4, and seeks to establish an interoperability standard for many companies to adopt, and to enable a smarter network with intelligence. Zigbee, or 802.15.4, sits below Bluetooth in terms of data rate. The operational range of ZigBee is typically stated as 10-75 m compared to 10 m for Bluetooth. Zigbee uses a basic master-slave configuration suited to static star networks of many infrequently use devices that talk via small data packets. Bluetooth's protocol is more complex since it is geared towards handling voice, images, and file transfers in ad-hoc networks. Bluetooth devices can support scatternets of multiple smaller non-synchronized networks (piconets). It only allows up to 8 slave nodes in a basic master-slave piconet set-up. Zigbee nodes spend much of their time sleeping, but the protocol is optimized for quick wake up and response. When a Zigbee node is powered down, it can wake up and get a packet in around 15 msec whereas a Bluetooth device would take around 3 sec to wake up and respond.

Another way of looking at the various technologies and where 802.15.4 fits:

TABLE 2

| Name | GPRS/GSM | Wi-Fi 802.11b | Bluetooth 802.15.1 | Zigbee 802.15.4 |
| --- | --- | --- | --- | --- |
| Application Focus | Wide Area Voice & Data | Web, E-mail, Video | Cable Replacement | Monitoring and Control |
| System Resources | 16 MB+ | 1 MB+ | 250 KB+ | 4 KB-32 KB |
| Battery Life (days) | 1-7 | 0.5-5 | 1-7 | 100-1000+ |
| Network Size | 1 | 32 | 7 | 255/65,000 |
| Bandwidth (KB/s) | 64-128+ | 11,000+ | 720 | 20-250 |
| Transmission Range (meters) | 1,000+ | 1-100 | 1-10+ | 1-100+ |
| Success Metrics | Reach, Quality | Speed, Flexibility | Cost, Convenience | Reliability, Power, Cost |

The wireless cameras available today use the high data rate 802.11b wireless technology and due to their high power consumption, typically require 110 or 220-volt "wall" power. These solutions suffer from several drawbacks. Some of these units are battery powered but require many batteries, such as 6 AA cells, and only work for a short time period, such as 2 to 4 hours, before exhausting the batteries. As a result of the many battery cells, these units are large and heavy. As a result of the power cords, placement and view are very limited, or power cords must be run making installation and movement inflexible. Current 802.11b wireless imaging transfer solutions require complex setup and configuration, as they are typically "IP Addressable" and connect to the internet via an 802.11b wireless ethernet connection. They must be managed and configured as if they are other computers on the internet. While current 802.11b wireless imaging transfer solutions may allow from 1 to N cameras within a local area network, these are not automatically configured for 1 to 254 nodes as with the 802.15.4 protocol. The 802.11b solutions are relatively expensive and run from $200 to $300 per camera. Finally, current 80211b wireless imaging transfer solutions do not allow the passing of messages from node to node, so are limited by their direct range from end node to hub.

Digital images typically require anywhere from 10 Kilo Bytes up to 2,000 Kilo Bytes of storage. VGA images are 640×480 pixels, or 307,200 pixels. Each Pixel typically has 2 bytes of data associated with it. Therefore, a regular VGA image will contain 614,000 Bytes of data. JPEG compression routines can compress this image 10:1; 20:1; 30:1; and more, down to under 20K Bytes. At a 30:1 compression, a 20K Byte image can be transported at 15K Bytes/Second in 1.25 seconds. Additional JPEG compression and information reduction routines can bring this image down to, say, 9K. However, each reduction in size will correspond to a reduction in the information content of the picture, and a reduction in the clarity of the resulting picture. Lesser quality picture standards, such as QCIF (176×144) or QQVGA (160×120) are available to reduce the initial image size, however, these will display on correspondingly smaller screens or views such as a cell phone screen. A VGA image displays as roughly a 6"×8" image on a standard computer screen.

Processing techniques can "shrink" the image size at the expense of image quality. For a given image size, say 30 Kilo Bytes, a high bandwidth system can transfer images quickly; while a low bandwidth system requires more time. The IEEE 802.15.4 wireless protocol operates at several speeds: 240, 40, and 20 kilo bits per second. At 240 kilo bits per second, a 30 kilo byte image would take 1 second to transfer, and with overhead would take up to 100% longer, or 2 seconds. At 40 kilo bits per second, a 30 kilo byte image would take 6 seconds to transfer, and with overhead would take up to 100% longer, or 12 seconds. This is seen as very long latency. Since most image transfer applications require low latency (i.e., you hear a baby cry and want to immediately see the image) and since the IEEE 802.15.4 wireless protocol is considered low-bandwidth, in the past it has not been considered suitable for image transfer applications. Previously, any file size greater than an order of magnitude greater than the 802.15.4 packet size has not been feasible.

A Zigbee system includes several components. The most basic is the device. A device can be a full-function device (FFD) or a reduced-function device (RFD). A network should include at least one FFD, operating as the PAN coordinator.

A solution is needed that enables many, low-cost, low-maintenance, small, battery-powered cameras to be flexibly placed in a network configuration. These cameras should be light enough to be placed with adhesive, thus allowing the user to "peel n stick" the cameras in out-of-the-way places. These cameras should cost less than $50 a piece, compared to the $200-$300 802.11b solutions available on the market today. They should be self-configuring and announce themselves to the WPAN coordinator (FFD) that they exist. The software that runs on the desktop should capture the presence of each camera end node and show it's health with signal strength and battery life, so that setup and maintenance of the 802.15.4 network is absolutely simple. Wireless ethernet should not be required to arrange a network, but rather, the devices themselves should create their own network and the coordinator can be powered directly from the USB connection of a mobile lap-top computer, thus, a network can be established anywhere the camera RFD's can communicate with their FFD coordinator. This enables extreme mobility of the network. Finally, the cameras should provide for some kind of alert, either a beep or light flash, to indicate that they are capturing images to address general public concerns about being "watched".

Thus a need exists to bring together CMOS imaging technology, the IEEE 802.15.4 wireless protocol, and control software to create a flexible, low-cost solution to information delivery using images.

SUMMARY OF THE INVENTION

One of the objects of the present invention is to overcome the aforementioned problems and deficiencies. For example, an aspect of the present invention builds on digital imaging technologies using two newer pieces of technology. It combines the wireless IEEE 802.15.4 low power, low bandwidth protocol with CMOS imaging devices. In order to combine the imager solutions with an 8-bit HCO8 hardware architecture, the inventors propose storing one or more images in a temporary location, or buffer, so that it may be moved from end node to hub via the 802.15.4 architecture's transport limitations of 127 Bytes per packet. This buffer may exist on the Protocol Handler processor or on an adjunct flash component on the end node. The Transchip 5740 will allow up to 60K of storage on the Applications Processor; while other solutions will force the image through to the Protocol Handler on the End Node, where there is 32K or more of Flash storage space for temporary buffering of the image. Once the image is "stored" in the Applications Processor or in the Protocol Handler (within a flash memory for example), the 802.15.4 transport mechanism may move the picture in small "chunks". This 802.15.4 transport architecture allows for 127 Bytes per packet. However, the effective payload is approximately 100 Bytes per packet, or per frame. Depending on the mode of operation of the 802.15.4 network (i.e., Beacon or Polling), the image stored in flash memory as, for example, 30K Bytes, can be either streamed or moved in 100 Byte "chunks" depending on acknowledgments and error correction within the algorithms. This is dependent on the inherent protocol handling of the 802.15.4 stack and logic of the network. Thus, an aspect of the present invention permits extraction of useful information (up to and including the entire file, although that is rarely necessary) in a timely manner from file sizes greater than an order of magnitude (i.e., ten times) greater than the 802.15.4 packet size transferred over an 802.15.4 network.

Thus, an aspect of the present invention takes advantage of a suite of technologies to enable the delivery of images over low-power RF networks using battery-powered cameras. Several advantages of these solutions are their integration into the 802.15.4 RF network, simplicity of setup and maintenance, flexibility of placement, and battery powered cameras. Due to their low current consumption and hibernation modes, the RF Networks' components can operate on battery power for long periods of time. The inventors have integrated digital CMOS imaging and the new, low-power IEEE 802.15.4 RF standard to create a "Plug and Play" remote wireless camera monitoring solution. Some "off the shelf" components may be used (such as the Transchip 5740 imager and the Freescale 802.15.4 ZigBee Transceiver (Evaluation Kit DIG528-2, part number 80000528000 R0203.DSN, Rev R02.03); however, the integration represents a novel concept. The integrated 802.15.4 cameras operate using flexible battery power and with the advantages of 802.15.4, should have long battery life. The inventors have added software to enable the solution to "plug and play" with up to 254 cameras controlled from 1 Coordinator, or Hub, plugged into the USB port of a personal computer. The USB port provides the power for the Coordinator. The 802.15.4 protocol enables us to communicate over ranges from a few meters to tens of meters, enabling a complete surveillance solution to cover a home or office complex. The range of the system can be extended substantially with the addition of a repeater.

Figure 1:
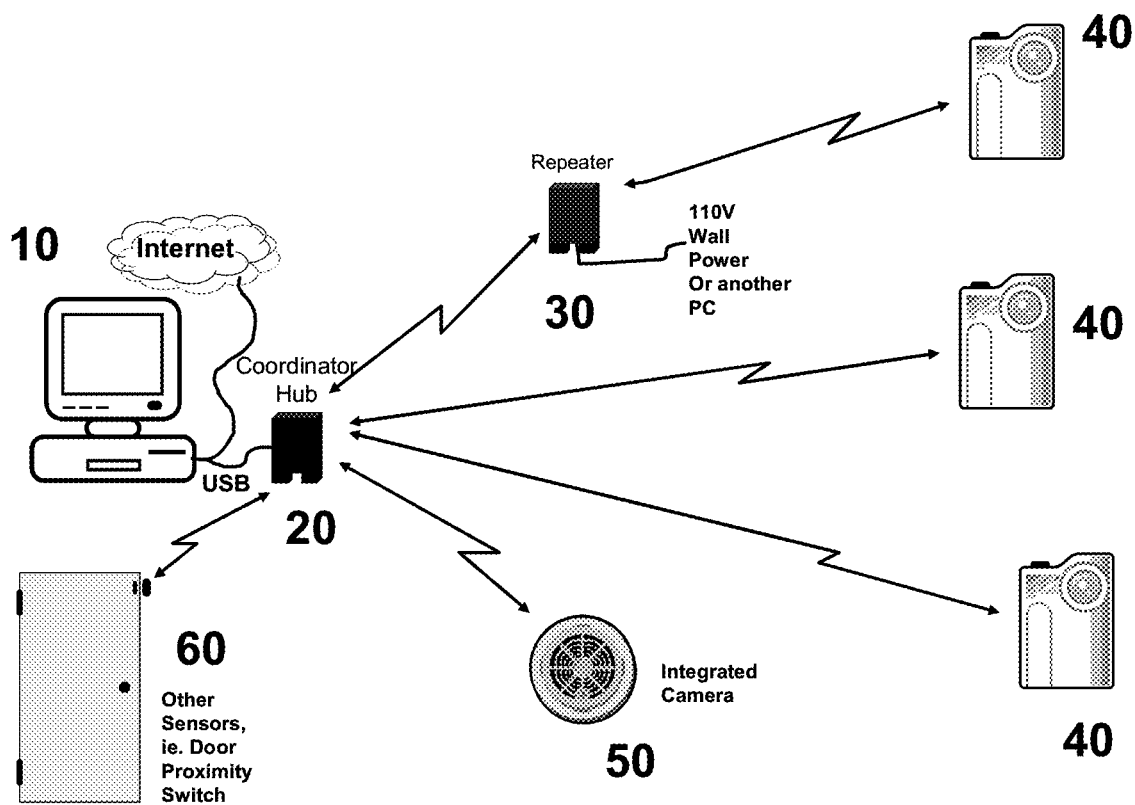
FIG. 1 is a block diagram showing a first exemplary embodiment of an 802.15.4 network according to the present invention.

Throughout the figures, the same reference numerals and characters, unless otherwise stated, are used to denote like features, elements, components or portions of the illustrated embodiments. Moreover, while the present invention will now be described in detail with reference to the figures, it is done so in connection with the illustrative embodiments.

DETAILED DESCRIPTION OF THE EXEMPLARY EMBODIMENTS

FIG. 1 depicts an exemplary embodiment of an 802.15.4 network according to the present invention. The basic system operates via the interaction of several components as shown in FIG. 1. In the basic setup, a computer 10 such as a personal computer (PC) with some control software requests an image from the system. The request could be for an image from one or multiple cameras within the network. The request may be based on a particular time period that has passed, or may be based on a triggering event (such as a door opening and triggering a sensor). The request is first directed to the Coordinator or Hub 20, which is attached to the computer via, perhaps, a USB connection. The Coordinator is built using an 802.15.4 Low Power RF Radio. The Hub 20 then communicates using a low-power RF protocol with the appropriate Repeaters 30 and Camera End Nodes 40 to acquire the image. The Repeaters may be fabricated using an 802.15.4 Low Power RF Radio. End Node Cameras may come in many forms and due to their small size, may be integrated into common household devices such as a smoke alarm 50. Additional integrated camera devices 50 which are integrated with other sensors may be present. The Camera End Nodes 40 may be integrated with an 802.15.4 Low Power RF radio. The Camera End Nodes 40, 50 are intelligent and accept commands from the computer's 10 control software such as "Zoom", "Pan", "Low Quality Image", or "High Quality Image". Finally, the network may contain other 802.15.4 sensors for intelligence such as a door proximity switch 60, or other network sensors. These may communicate with the Coordinator/hub to capture images upon a pre-determined logic. For example, from FIG. 1, the opening of a door triggers a signal from the door proximity switch 60 to the Coordinator 20, which requests an image from the camera focused on the doorway 40.

Figure 2:
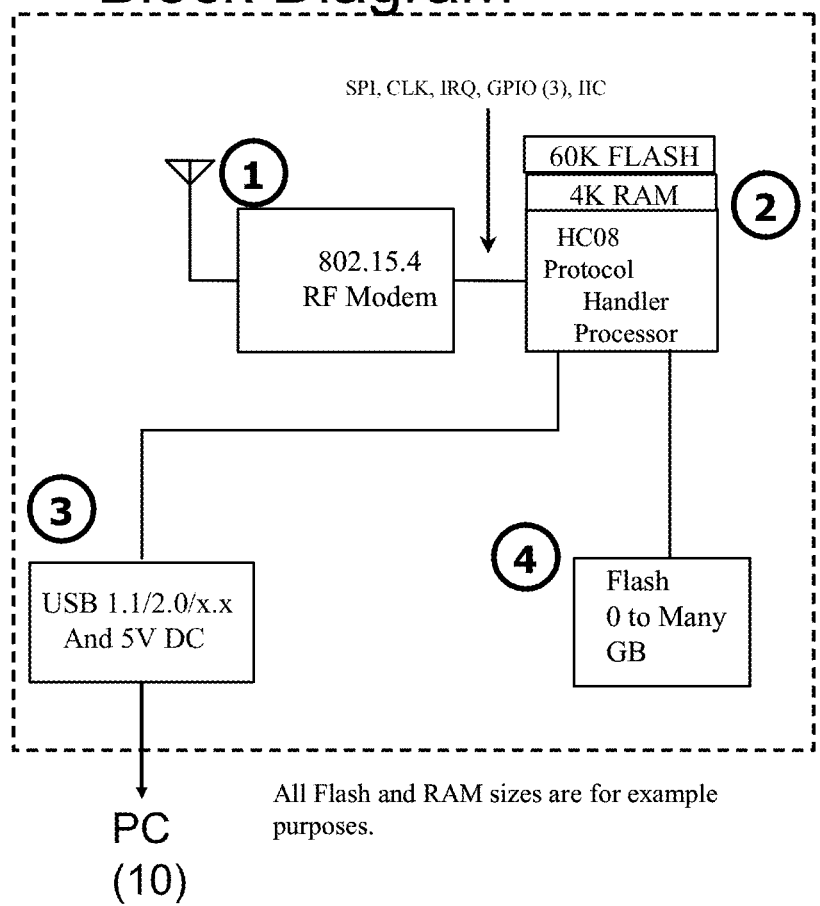
FIG. 2 is a block diagram showing the WPAN 802.15.4 FFD Coordinator/Hub of FIG. 1.

Detailed System Operational Description for Integration of a CMOS Imager/Camera into an IEEE 802.15.4 Network FIG. 2 is a block diagram of the Coordinator/Hub 20. A request for an image may come from the internet to the PC or locally from the PC control software. The request is then directed to the Coordinator/Hub 20 and enters through the PC USB connection 203. The request is captured by the Protocol Handler Processor 202, and waits for the next available timeslot from the 802.15.4 protocol stack and RF modem 201. Using the network logic, the Protocol Handler Processor 202 requests an image from the camera end node 40. In an alternate embodiment, the Coordinator 20 may be IP addressable, and thus a gateway PC 10 may not be required.

Figure 3:
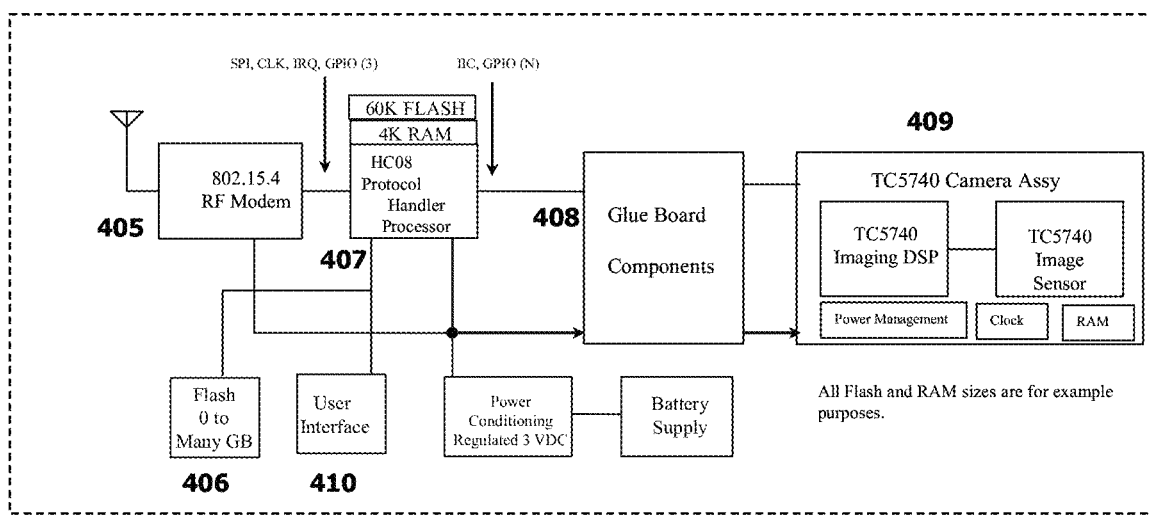
FIG. 3 is a block diagram showing the WPAN 802.15.4 RFD Camera End Node of FIG. 1.

FIG. 3 represents the Camera End Node, block 40, from FIG. 1. At the Camera End Node 40, the system may "wake up" upon a pre-determined timeslot based on the 802.15.4 protocol to see if a request for an image exists from the Coordinator/Hub 20. It may also "wake up" because of a triggering event (e.g., door opening, alarm, change of temperature, manual selection, etc.). Here, RF modem 405 is communicating with RF modem 201. Within an 802.15.4 system, these timeslots may be from a few hundred milliseconds out to many minutes between "wake-up" periods.

When an image request exists, this request is received by the Camera End Node at RF Modem 405 and held within the Protocol Handler 407. The request is then sent through the glue board components 408 to the TC5740 Camera Assembly 409. (FIGS. 5A-5D provides further detail on the interfaces between 407 and 409.) The image command may contain a number of camera adjustment requests such as focus, pan, zoom, low quality, thumbnail, high quality, etc. image adjustments. The camera will take the picture, process it through its Imaging DSP, and hold the processed JPEG image within the camera assembly's internal RAM. Alternative implementations may allow the image to be stored within the local flash 406. The camera 409 will then communicate back through the Glue Board Components, 408, with the Protocol Handler 407 and will begin passing/streaming the image back to the Coodinator/Hub 20 using the connections between the two 802.15.4 RF modems, 405 and 201, in approximately 100 byte packets.

If requested, the camera may also take a very high quality image and store the entire image within the picture buffer of the camera assembly 409 or of the camera end node's flash 406. The camera may process the image further into a thumbnail or lower quality/lower density image. This thumbnail or lower quality image may be transmitted back through the Glue Board Components, 408, with the Protocol Handler 407, etc. as described above. The transmission of a highly compressed, low resolution thumbnail normally provides adequate information that there is nothing of interest back to the requestor. If further information is requested on this image, the camera may take a new image or simply take the existing image in memory and process the image further with digital zooming, panning, cropping, variable resolutions, and lossy compression techniques to provide maximum information using minimum bandwidth. If requested, maximum detail could be provided via the entire pixel bit map using a lossless compression technique.

The camera end node 40 may include extendable flash memory 406 to enable the camera to take from 1 to N images using pre-determined logic within the Protocol Handler Processor 407 and store these images (or streaming video) into local memory 406. The flash memory 406 may take the form of a "removable" storage such as USB-sticks, Compact Flash (CF), Secure Digital (SD) Flash cards, or other removable media. These images would then be retrieved at a later time using system logic or when the Coordinator/Hub 20 acquires, or comes in range of, the end node, or vice-versa (the end node moves within range of the Coordinator/Hub).

The camera end node 40 may include a user interface 410 for communicating the camera end node status. This interface might be as simple as an LED that would blink to communicate "on", "taking an image", "communicating with the network", etc. Alternatively, the user interface may include a multi-color LED, multiple LED's, a transducer, or a very basic LCD for communicating status, how many images have been taken, or how many images are stored on resident flash. This user interface 410 may also enable a "friendly" surveillance camera, which could provide an advance warning that it is about to take a picture through a beep or LED flash.

The Coordinator/Hub 20 generally acts as a "pass-through" and sends the image to the PC 10 to be assembled. Flash memory 204, on the Coordinator/Hub 20 provides for increased flexibility to enable large images or many images to be captured and contained within the Coordinator via pre-determined logic in the advent that a host PC 10 is unavailable or unable to pull the image. In some cases, the Coordinator will be "IP addressable" and connect directly to the Internet to receive image requests for the 802.15.4 network.

When the image is completely sent and checksum verified, it may be displayed within a graphics window on the PC 10, or transmitted out through the internet to the requesting source.

In the above description, the 802.15.4 "stack" was performing the Coordinator/Hub to Camera End Node communications, with from 1 to N end nodes, along with clear channel scanning and collision avoidance algorithms; and beacon or timeslot adjustments. These capabilities are built into the 802.15.4 software stack and are easily controlled via the Protocol Handler Processors such as 407 in the End Node block diagram.

Camera End Node (40) Behavior at Startup

Referring to FIG. 3, the Transchip 5740 camera assembly that the inventors have tested requires that it receive its firmware for operating the Imaging DSP and image sensor upon power-up. To accommodate this, the inventors have inserted a 64 KB flash eeprom, 406 to hold the firmware. Upon powerup, the firmware is downloaded from the EEProm into the TC5740 sensor. Note this firmware may be from 35 KB to 60 KB and is determined by Transchip.

Behavior of a Repeater, Block (30):

The block diagram of a repeater 30 within FIG. 1 may be almost identical to a Coordinator/Hub 20, with the exception that 203 from FIG. 2 should contain voltage management components to enable the repeater to be plugged into a regular power outlet, such as a 110V or 220V wall-socket, or 5V USB connection to a PC. A repeater is preferably "always on", and thus would drain power from a battery source quickly unless plugged into a steady power source. Another Coordinator/Hub 20 plugged into a different PC may also act like a repeater if the network is configured appropriately. In this case, its block diagram would be the same as 20.

Figure 4:
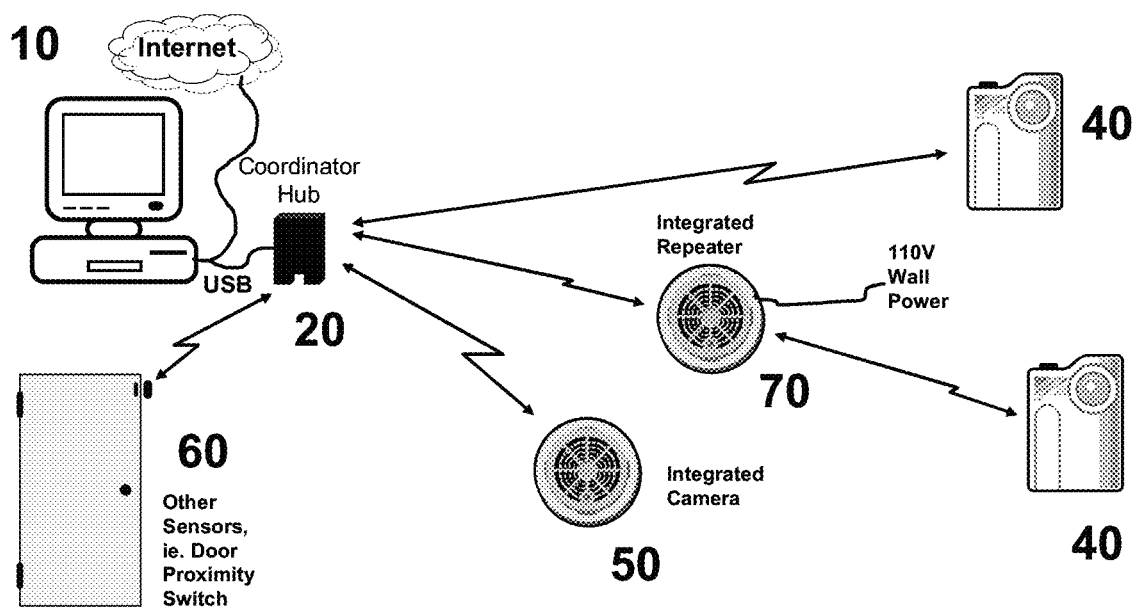
FIG. 4 is a block diagram showing a second exemplary embodiment of an 802.15.4 network according to the present invention.
Figure 5A:
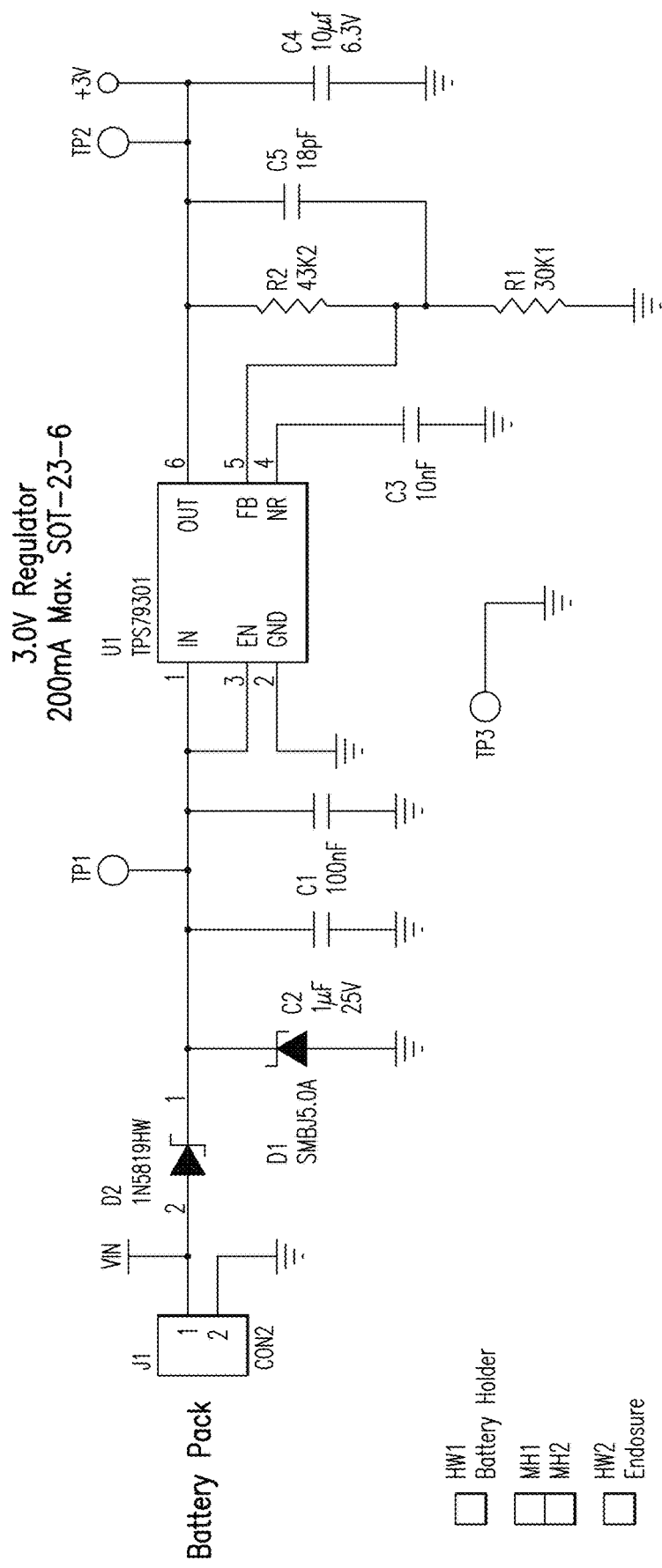
FIGS. 5A-5D are a circuit diagram showing the interfacing between the TC5740 CMOS Imager of FIG. 4 and the Freescale HCS08 MicroController.
Figure 5B:
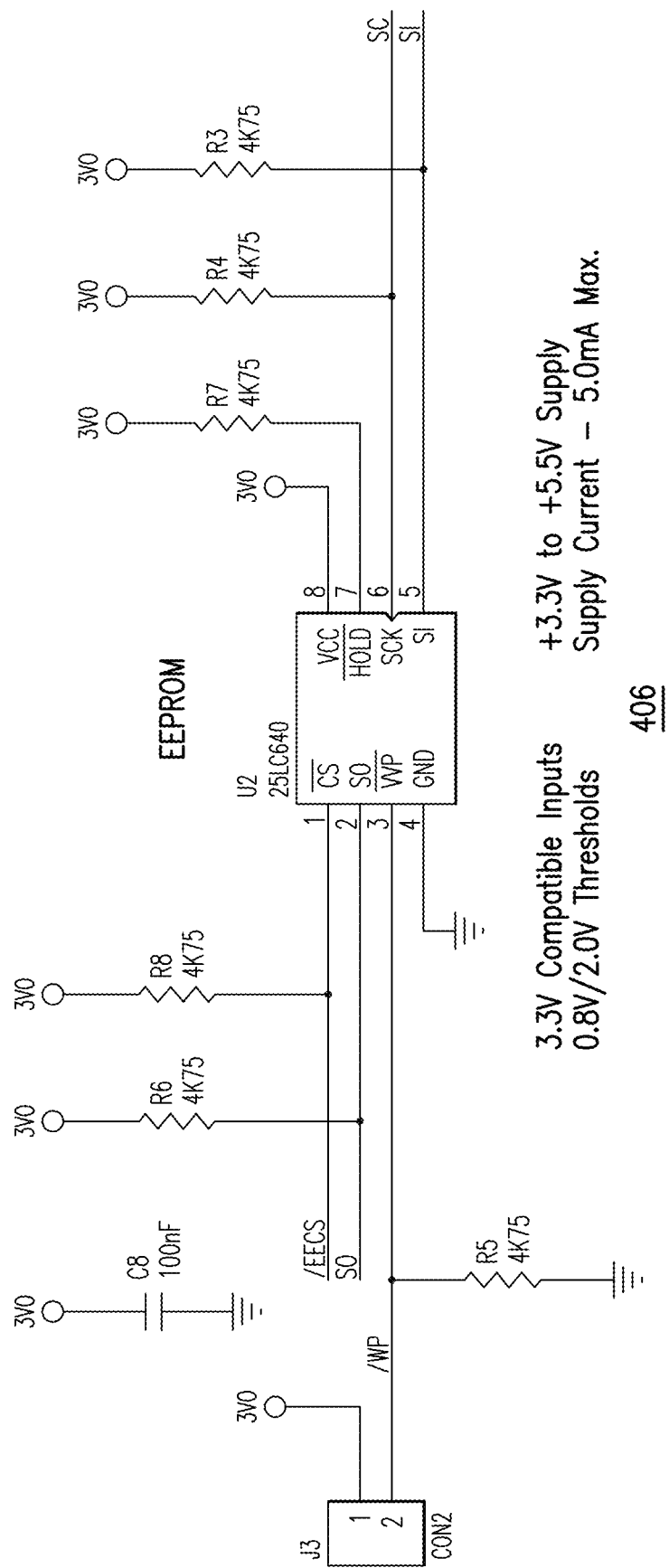
Figure 5C:
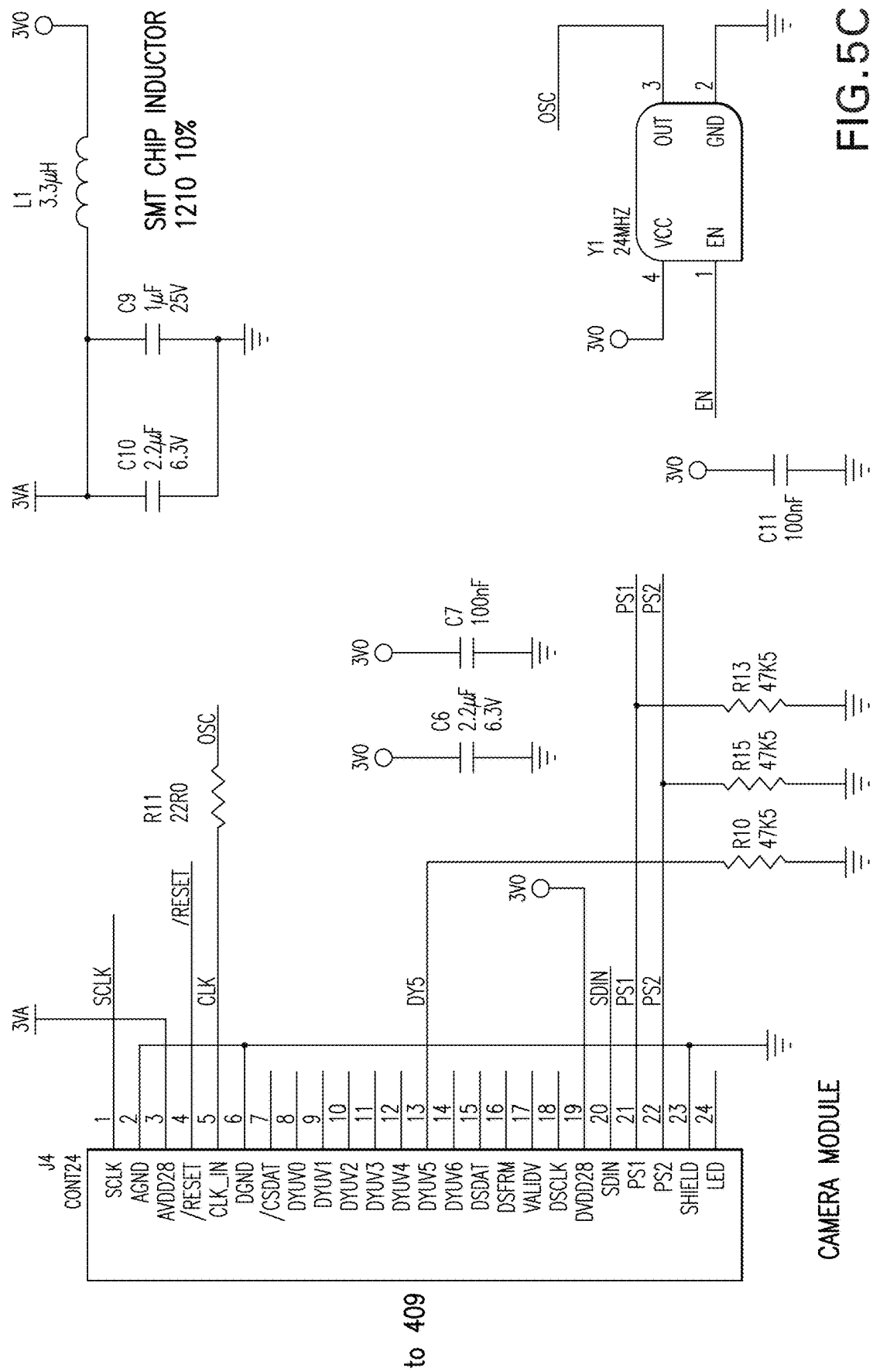
Figure 5D:
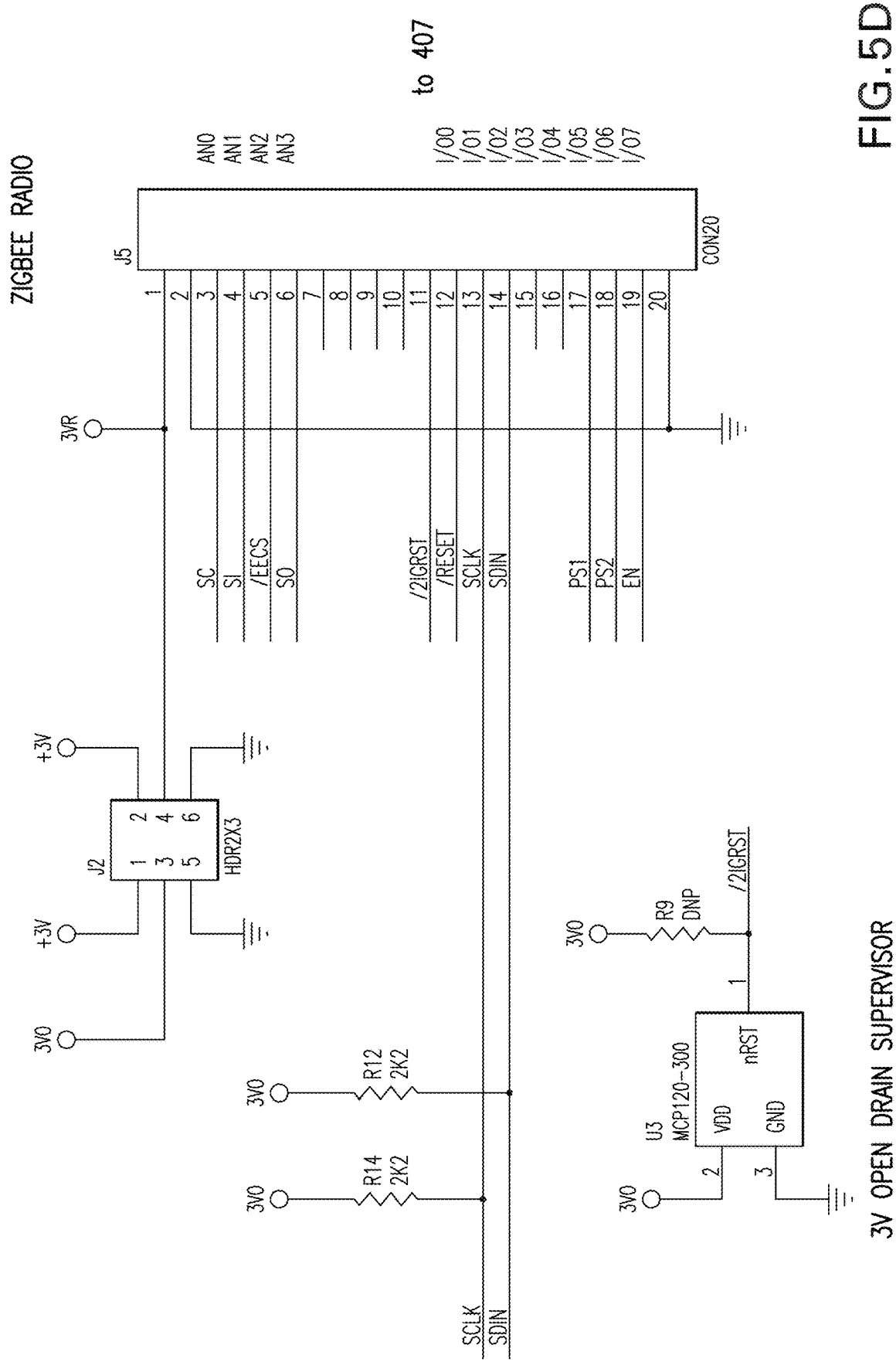

Behavior of an Integrated Camera, Block (50), or Integrated Repeater, Block (70):

Referring to FIG. 4, the block diagram of an integrated Camera 50, will depend on the sensor and associated logic programmed into its protocol handler processor. A smoke detector is depicted in the system setup example. In general, the integrated camera 50 block diagram will look very similar to the Camera End Node 40 block diagram (see FIG. 3), with the addition of more sensors, similar to 409, connected back through a connector block similar to 408 to the protocol handler processor 407. These "glue board components" could be combined into 408 or separated onto separate boards for an improved platform design approach.

An integrated camera similar to 50 of FIG. 4 could act both as a reduced functional device where the camera co-exists with the smoke detector; as a reduced function device where the camera is integrated with the smoke detector to send images only upon alarm; as a repeater whereby it simply contains the 802.15.4 RF modem to extend range of the camera end nodes 40; or finally as both an integrated camera and repeater since it's power supply would enable an "always on" operation, and the camera could enable images upon request or upon smoke detector alarm.

There are numerous options for the behavior of an integrated camera sensor such as 70 from FIG. 4. For example:

TABLE 3

| RF Behavior | Camera (Y or N) | Comments |
|---|---|---|
| Repeater (FFD) | Yes | Camera function could be either dependent or independent of smoke sensor. To extend range of end nodes, to act as a clandestine range extender. |
| End Node (RFD) | Yes | Camera function could be either dependent or independent of smoke sensor. |
| Repeater (FFD) | No | To extend range of the end nodes, to act as a clandestine range extender |
| End Node (RFD) | No | To alert the intelligent network of an event, such as smoke detection |

Behavior of "Other Sensors", such as a Door Proximity Sensor (60) from FIG. 4:

The block diagram of other sensors, such as Block "60" from FIG. 4, will depend on the sensor and associated logic programmed into it's protocol handler processor. A door proximity switch is depicted in the system setup example. In general, the integrated door proximity switch 60 block diagram will look very similar to the Camera End Node 40 block diagram from FIG. 3 with the addition of more sensors, similar to 409, connected back through a connector block similar to 408 to the protocol handler processor 407. These "glue board components" could be combined into 408 or separated onto separate boards for an improved platform design approach.

End Node Sensor Types Beyond Cameras, Door Proximity Switches, and Smoke Alarms, Blocks 408 and 409:

While the inventors have focused on a few particular sensors, such as cameras, door proximity switches, and smoke alarms, many other options exist for an integrated end node. In particular, an intelligent network would contain motion, light, smoke, water, temperature, and sound sensors among others. These sensors would integrate into the network with some "glue" components 408 and the actual sensors themselves 409 from the Integrated Camera End Node 40 block diagram. Those skilled in the art would be able to integrate any of these standard sensors into the network topology.

FIGS. 5A-5D are a circuit diagram showing an exemplary embodiment of the interfacing the inventors have tested. FIGS. 5A-5D depict the interfacing between an exemplary Camera (the TC5740) and the Freescale HCS08 MicroController. The 24-pin connector titled "Zigbee Radio" came from the Freescale 13192 design, while the 20-pin connector titled "camera module" came from the TC5740 camera module. Remaining circuitry was placed on the interface board 408 to provide interconnection, EEProm 406, oscillator and battery management between the camera and modem.

It is contemplated that many versions or embodiments of the invention may be provided. Although the invention has been described with a certain degree of particularity, it should be recognized that elements thereof may be altered by persons skilled in the art without departing from the spirit and scope of the invention. As such, the foregoing description has been presented for purposes of illustration and description. It is not intended to be exhaustive or to limit the invention to the precise form disclosed. Obvious modifications or variations are possible in light of the aforementioned teachings. For example, there are many applications for wireless, battery-powered, "peel n stick" cameras operating within an 802.15.4 network. The inventors foresee low-cost home monitoring applications, business security/surveillance applications, "intelligence" applications where cameras are used on conjunction with other devices to manage information, pet-cams and refrigerator-cams, and integrations into other devices such as lamps, TV's, and clocks, etc.

We claim:

1. A system comprising:
    a battery-powered end node capable of being attached to a moveable item;
    a modem in the end node, the modem being capable of communicating over an 802.15.4 network;
    a coordinator, capable of communicating over the 802.15.4 network and capable of monitoring signal strength from the end node;
    a computer, capable of communicating with the coordinator;
    a camera comprising a CMOS image sensor and a low power RF radio, the camera being capable of operating on battery power and capable of communicating over the 802.15.4 network; and
    a buffer in the camera configured to store portions of a picture, the picture comprising data of a size in bytes at least an order of magnitude greater than the size in bytes of an 802.15.4 packet;
    wherein, after a first monitored signal strength reading at the coordinator is below a first threshold:
        the coordinator is configured to alert by at least one of audibly, visually, and transmitting a notification;
    wherein, after a second monitored signal strength reading at the coordinator is above a second threshold:
        based on a learned pattern of events, at least one of the coordinator and the computer is configured to transmit a command to the camera to take the picture.

2. The system of claim 1, wherein the thresholds are based on RSSI measurements.

3. The system of claim 1, comprising a further coordinator, the further coordinator being capable of: communicating over the 802.15.4 network, monitoring signal strength from the end node, and communicating with the computer.

4. A method comprising:
    with a coordinator, monitoring, over an 802.15.4 network, signal strength from a battery-powered end node attached to a moveable item;
    when a first signal strength reading is below a first threshold:
        with the coordinator, alerting by at least one of audibly, visually, and transmitting a notification;
    when a second signal strength reading is above a second threshold:
        based on a learned pattern of events, transmitting, by at least one of the coordinator and a computer capable of communicating with the coordinator, a command to take a picture with a camera, the picture comprises data of a size in bytes at least an order of magnitude greater than the size in bytes of an 802.15.4 packet;

wherein, the camera comprises a CMOS image sensor, a low power RF radio, and a buffer, the camera being capable of operating on battery power and capable of communicating over the 802.15.4 network, and the buffer being capable of storing portions of the picture.

5. The method of claim 4, wherein the thresholds are based on RSSI measurements.

6. A non-transitory computer readable medium comprising a set of executable instructions to direct a processor to perform the method of claim 5.

7. The method of claim 4 comprising:

with a further coordinator, monitoring, over the 802.15.4 network, signal strength from the battery-powered end node attached to the moveable item;

when first signal strength reading at the further coordinator is below the first threshold:

with the further coordinator, alerting by at least one of audibly, visually, and transmitting a notification; and when a second signal strength reading at the further coordinator is above the second threshold:

transmitting, by at least one of the further coordinator and the computer, a command to take a picture with the camera.

8. A non-transitory computer readable medium comprising a set of executable instructions to direct a processor to perform the method of claim 7.

9. A non-transitory computer readable medium comprising a set of executable instructions to direct a processor to perform the method of claim 4.

* * * * *